United States Patent
Anderson et al.

(10) Patent No.: US 10,331,944 B2
(45) Date of Patent: Jun. 25, 2019

(54) TECHNOLOGIES FOR DYNAMIC PERFORMANCE OF IMAGE ANALYSIS

(71) Applicant: INTEL Corporation, Santa Clara, CA (US)

(72) Inventors: Glen J. Anderson, Beaverton, OR (US); Michael E. Kounavis, Portland, OR (US); Omesh Tickoo, Portland, OR (US)

(73) Assignee: INTEL Corporation, Santa Clara, CA (US)

( * ) Notice: Subject to any disclaimer, the term of this patent is extended or adjusted under 35 U.S.C. 154(b) by 0 days.

(21) Appl. No.: 14/866,888

(22) Filed: Sep. 26, 2015

(65) Prior Publication Data

US 2017/0091538 A1 Mar. 30, 2017

(51) Int. Cl.
```
G06F 3/01     (2006.01)
G06F 3/03     (2006.01)
G06K 9/00     (2006.01)
G06K 9/46     (2006.01)
G06T 7/10     (2017.01)
G06T 7/70     (2017.01)
G06T 7/194    (2017.01)
```
(52) U.S. Cl.
CPC ......... *G06K 9/00355* (2013.01); *G06F 3/012* (2013.01); *G06F 3/017* (2013.01); *G06F 3/0304* (2013.01); *G06K 9/4652* (2013.01); *G06T 7/10* (2017.01); *G06T 7/194* (2017.01); *G06T 7/70* (2017.01); *G06K 2209/27* (2013.01)

(58) Field of Classification Search
CPC ... G06T 7/10; G06T 7/70; G06T 7/194; G06F 3/012; G06F 3/017; G06F 3/0304; G06K 9/00355; G06K 9/4652
See application file for complete search history.

(56) References Cited

U.S. PATENT DOCUMENTS

| | | | |
|---|---|---|---|
| 6,798,897 B1 * | 9/2004 | Rosenberg | G06T 7/35 348/154 |
| 2008/0095436 A1 * | 4/2008 | Kim | G06K 9/38 382/173 |
| 2009/0041359 A1 * | 2/2009 | Park | G06K 9/00771 382/199 |
| 2011/0169969 A1 * | 7/2011 | Matsuda | H04N 1/00204 348/207.2 |
| 2012/0134548 A1 * | 5/2012 | Rhoads | G06Q 30/06 382/118 |

(Continued)

OTHER PUBLICATIONS

Baraldi et al. "Gesture recognition using wearable vision sensors to enhance visitors' museum experiences." IEEE Sens. J 15.5 (May 2015): 2705-2714. (Year: 2015).*

(Continued)

*Primary Examiner* — Katrina R Fujita
(74) *Attorney, Agent, or Firm* — Barnes & Thornburg LLP

(57) ABSTRACT

Technologies for dynamic performance of image analysis are disclosed. When a camera captures one or more images, context data such as data indicative of motion of the camera is captured as well. The context data is used to determine an image analysis parameter for an image analysis procedure to be performed on the one or more images. The image analysis parameter may dictate which image analysis procedure is to be performed and/or provide input to the image analysis procedure.

14 Claims, 6 Drawing Sheets

(56) References Cited

U.S. PATENT DOCUMENTS

| | | | |
|---|---|---|---|
| 2014/0240363 A1* | 8/2014 | Hong | G09G 5/34 |
| | | | 345/684 |
| 2015/0172541 A1* | 6/2015 | Anderson | H04N 5/232 |
| | | | 348/218.1 |
| 2015/0221066 A1* | 8/2015 | Kobayashi | G06T 11/00 |
| | | | 382/284 |
| 2016/0307334 A1* | 10/2016 | Dos Santos Mendonca | |
| | | | G06K 9/46 |
| 2017/0332008 A1* | 11/2017 | Tsuchiya | G03B 15/00 |

OTHER PUBLICATIONS

Li et al. "Pixel-level hand detection in ego-centric videos." Proceedings of the ieee conference on computer vision and pattern recognition. 2013. (Year: 2013).*

Saxen et al. "Image-based gesture recognition for user interaction with mobile companion-based assistance systems." Intelligent Systems Design and Applications (ISDA), 2012 12th International Conference on. IEEE, 2012. (Year: 2012).*

Serra et al. "Hand segmentation for gesture recognition in egovision." Proceedings of the 3rd ACM international workshop on Interactive multimedia on mobile & portable devices. ACM, 2013. (Year: 2013).*

* cited by examiner

TECHNOLOGIES FOR DYNAMIC PERFORMANCE OF IMAGE ANALYSIS

BACKGROUND

Mobile computing devices are quickly becoming ubiquitous tools for the average consumer. Mobile computing devices, such as smart phones, smart glasses, tablet computers, and the like, may be used for a variety of purposes including work, entertainment, and information research. As mobile computing devices become more ingrained into the everyday life of users, alternative or additional modes of interacting with the mobile computing devices are becoming ever more important. For example, hands-free operation (e.g., via voice commands) and gesture control (e.g., via hand gestures) are popular alternative mechanisms to control mobile computing devices.

Gesture control of mobile computing devices often involves the analysis of images captured by a camera, which may be integrated with or communicatively coupled to the mobile computing device. The captured images are analyzed to detect hand gestures performed by a user, which are typically interpreted as commands for the mobile computing device. Various kinds of image analysis techniques may be used to detect a user input gesture. For example, hand feature detection and/or skin detection algorithms may be used to identify whether a hand is actually present in the captured image. However, some image analysis algorithms or techniques may perform better under certain conditions, while others may perform poorly. Additionally, computing resources are often limited on mobile computing devices, which may limit the robustness and performance of the image analysis.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
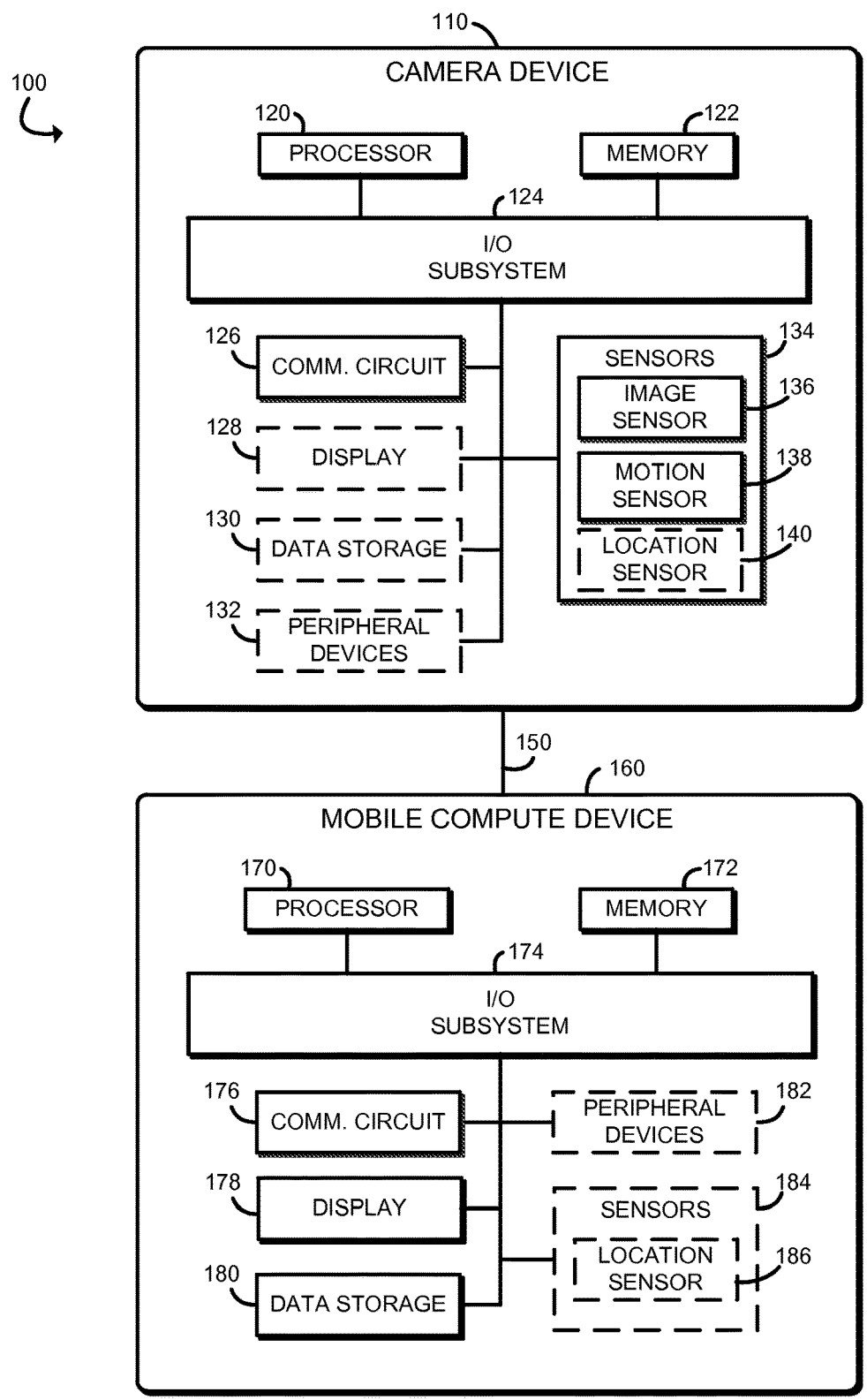
FIG. 1 is a simplified block diagram of at least one embodiment of a system for gesture detection.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); (A and C); or (A, B, and C). Similarly, items listed in the form of "at least one of A, B, or C" can mean (A); (B); (C): (A and B); (B and C); (A or C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an illustrative system 100 for image analysis includes a camera device 110 and a mobile compute device 160 in communication with each other over a connection 150. Although shown as separate devices in FIG. 1, the camera device 110 may be integral to the mobile computing device 106 in some embodiments. In use, as discussed in more detail below, the camera device 110 is configured to continuously, continually, or periodically capture images, as well as context data of the system 100 corresponding to each captured image. In the illustrative embodiment, the context data is embodied as, or otherwise includes, motion data indicative of motion of the camera device 110 when the camera device 110 captures an associated image, but may include additional or other context data in other embodiments. The camera device 110 is configured to transfer the captured images and corresponding context data to the mobile compute device 160 over the connection 150 for analysis thereon.

The mobile compute device 160 is configured to perform an image analysis procedure on the images captured by the camera device 110 based on the associated context data. For example, in the illustrative embodiment, the images captured by the camera device 110 may include a gesture performed by a user of this system 100 (e.g., a "thumbs up" gesture), which the mobile compute device 160 is configured to detect and act on. Although general algorithms for skin detection may be used by the computing device 106 to analyze the captured images, those algorithms may consume more computing resources and power than desired. As such, the mobile compute device 160 is configured to utilize the context data associated with each captured image to improve or optimize the image analysis. For example, the mobile compute device 160 may be configured to select one or more image analysis algorithms or techniques based on the context data associated with a particular captured image. In the illustrative embodiment, the context data corresponding to the one or more images comprises motion data of the camera device 110 at the time the one or more images was captured. If the context data indicates the camera was stationary, the image analysis may proceed assuming the background of the one or more images was stationary. Such an assumption may allow for an image analysis that can be done using fewer computational resources, such as by employing background subtraction. Of course, if the motion data indicates that the camera device 110 was moving when the image(s) was captured, additional or different image analysis procedures may be used to analyze the image for the user gestures as discussed in more detail below.

The camera device 110 may be embodied as any type of device capable of capturing images and performing the functions herein. For example, the camera device 110 may be embodied as or otherwise be included in, without limitation, a digital camera, one or more image sensors, a smartphone, a cellular phone, a tablet computer, a notebook computer, a laptop computer, a wearable computer, smart eyeglasses, a smart watch, a head-mounted display unit, a handset, a messaging device, a multiprocessor system, a processor-based system, a consumer electronic device, and/or any other computing device capable of capturing images. As discussed above, the camera device 110 may be integrated with, or otherwise form a portion of, the mobile compute device 160 in some embodiments.

As shown in FIG. 1, the illustrative camera device 110 includes a processor 120, an I/O subsystem 124, a memory 122, a communication circuit 126, and sensors 134, which illustratively include an image sensor 136 and a motion sensor 138. In some embodiments, one or more of the illustrative components of the camera device 110 may be incorporated in, or otherwise form a portion of, another component. For example, the memory 122, or portions thereof, may be incorporated in the processor 120 in some embodiments. Additionally, in some embodiments, the camera device 110 may be implemented in dedicated circuitry to capture the image and context data and to transmit the image and context data. Such dedicated circuitry may not necessarily be able to perform general computing tasks.

The processor 120 may be embodied as any type of processor capable of performing the functions described herein. For example, the processor 120 may be embodied as a single or multi-core processor(s), a single or multi-socket processor, a digital signal processor, a microcontroller, or other processor or processing/controlling circuit. Similarly, the memory 122 may be embodied as any type of volatile or non-volatile memory or data storage capable of performing the functions described herein. In operation, the memory 122 may store various data and software used during operation of the camera device 110 such as operating systems, applications, programs, libraries, and drivers. The memory 122 is communicatively coupled to the processor 120 via the I/O subsystem 124, which may be embodied as circuitry and/or components to facilitate input/output operations with the processor 120, the memory 122, and other components of the camera device 110. For example, the I/O subsystem 124 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 124 may form a portion of a system-on-a-chip (SoC) and be incorporated, along with the processor 120, the memory 122, and other components of the camera device 110, such as the image sensor 136, on a single integrated circuit chip.

The communication circuit 126 may be embodied as any type of communication circuit, device, or collection thereof, capable of enabling communications between the camera device 110 and the mobile computing device 106 and/or other devices. To do so, the communication circuit 126 may be configured to use any one or more communication technology and associated protocols (e.g., Ethernet, Bluetooth®, Wi-Fi®, WiMAX, near field communication (NFC), etc.) to effect such communication.

The sensors 134 may be embodied as any type of sensors capable of capturing various sensor data. As discussed above, the sensors 134 include the image sensor 136 and the motion sensor 138. The image sensor 136 may be embodied as any type of sensor capable of sensing or capturing an image(s) and generating sensor data indicative of the captured image(s). For example, the image sensor may be embodied as, or otherwise include a charge-coupled device (CCD) image sensor, a complementary metal-oxide-semiconductor (CMOS) image sensor, and/or other type of image sensor technology. Additionally, the image sensor 136 may be embodied as a two-dimensional or a three-dimensional image sensor (i.e., configured to capture/generate 2D or 3D images). The image sensor 136 may be configured to sense single or multiple images (e.g., video), as noted above, and sense visible light and/or invisible light, including infrared light, thermal light, ultra-violet light, x-rays, and/or the like.

The motion sensor 138 may be embodied as any sensor or device capable of sensing motion of the camera device 110 (e.g., a change in location and/or orientation) and generating sensor data indicative of such motion. For example, the motion sensor 138 may be embodied as, or otherwise include an accelerometer, a gyroscope, and/or other sensors capable of detecting one or more axes of movement of the camera device 110.

In some embodiments, the sensors 134 may also include one or more location sensors 140. The location sensor 140 may be embodied as any type of circuit or device capable of generating location data indicative of the present location of the camera device 110. For example, the location sensor 140 may be embodied as a Global Positioning System (GPS) circuit or the like. Additionally or alternatively, the location sensor 140 may be embodied as, or otherwise include, an altimeter to determine an altitude of the camera device 110. Further, in some embodiments, the location sensor 140 may be configured to determine the location of the camera device 110 based on signal trilateration or triangulation. Such location determination may be based on cellular signals, Wi-Fi hotspots, or other signals received by the camera device 110.

Of course, the camera device 110 may include other or additional components, such as those commonly found in a mobile computer (e.g., various input/output devices), in other embodiments. For example, the camera device 110 may also include a display 128, and may have dedicated data storage 130. The optional display 128 may be embodied as a heads-up display in some embodiments. The data storage 130 may be embodied as any type of device or devices configured for the short-term or long-term storage of data. For example, the data storage 130 may include any one or more memory devices and circuits, memory cards, hard disk drives, solid-state drives, or other data storage devices.

In some embodiments, the camera device 110 may further include one or more peripheral devices 132. Such peripheral devices 132 may include any type of peripheral device commonly found in a camera device or mobile computing device, for example, a hardware keyboard, input/output devices, peripheral communication devices, and/or other peripheral devices.

In the illustrative embodiment, the camera device 110 is communicatively coupled to the mobile compute device 160 over the connection 150. In some embodiments, the connection 150 is a direct connection between the camera device 110 and the mobile compute device 160, such as Ethernet, Bluetooth®, Wi-Fi®, WiMAX, near field communication (NFC), etc. In other embodiments, the connection 150 may be an indirect connection, wherein the camera device 110 and mobile compute device 160 communicate through a network, server, or other intermediary. Additionally, in embodiments in which the camera device 110 is integral to the mobile compute device 160, the connection 150 may be embodied as a hardware connection (e.g., circuit traces, wires, data bus, etc.).

The mobile compute device 160 may be embodied as any type of mobile device capable of performing the functions herein. For example, the mobile compute device 160 may be embodied as or otherwise include, without limitation, a digital camera, a smartphone, a cellular phone, a tablet computer, a notebook computer, a laptop computer, a wearable computer, smart eyeglasses, a smart watch, a head-mounted display unit, a handset, a messaging device, a multiprocessor system, a processor-based system, a consumer electronic device, and/or any other computing device capable of performing the functions herein. As shown in FIG. 1, the illustrative mobile compute device 160 includes a processor 170, an I/O subsystem 174, a memory 172, a communication circuit 176, a display 178, and data storage 180.

The processor 170 may be embodied as any type of processor capable of performing the functions described herein. For example, the processor 170 may be embodied as a single or multi-core processor(s), a single or multi-socket processor, a digital signal processor, a microcontroller, or other processor or processing/controlling circuit. Similarly, the memory 172 may be embodied as any type of volatile or non-volatile memory or data storage capable of performing the functions described herein. In operation, the memory 172 may store various data and software used during operation of the mobile compute device 160 such as operating systems, applications, programs, libraries, and drivers. The memory 172 is communicatively coupled to the processor 170 via the I/O subsystem 174, which may be embodied as circuitry and/or components to facilitate input/output operations with the processor 170, the memory 172, and other components of the mobile compute device 160. For example, the I/O subsystem 174 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 174 may form a portion of a system-on-a-chip (SoC) and be incorporated, along with the processor 170, the memory 172, and other components of the mobile compute device 160 on a single integrated circuit chip.

The communication circuit 176 may be embodied as any communication circuit, device, or collection thereof, capable of enabling communications between the mobile compute device 160 and other devices. To do so, the communication circuit 176 may be configured to use any one or more communication technology and associated protocols (e.g., Ethernet, Bluetooth®, Wi-Fi®, WiMAX, near field communication (NFC), etc.) to effect such communication.

The data storage 180 may be embodied as any type of device or devices configured for the short-term or long-term storage of data. For example, the data storage 180 may include any one or more memory devices and circuits, memory cards, hard disk drives, solid-state drives, or other data storage devices.

Of course, the mobile compute device 160 may include other or additional components, such as those commonly found in a mobile computer (e.g., various input/output devices), in other embodiments. For example, the mobile compute device 160 may include peripheral devices 182, and may have sensors 184 including a location sensor 186. Additionally, in some embodiments, one or more of the illustrative components may be incorporated in, or otherwise form a portion of, another component. For example, the memory 172, or portions thereof, may be incorporated in the processor 170 in some embodiments.

The location sensor 186 may be embodied as any type of circuit or device capable of generating location data indicative of the present location of the mobile compute device 160. For example, the location sensor 186 may be embodied as a Global Positioning System (GPS) circuit. Additionally or alternatively, the location sensor 186 may be embodied as an altimeter to determine an altitude of the mobile compute device 160. In some embodiments, the location sensor 186 may be configured to determine the location of the mobile compute device 160 based on signal trilateration or triangulation. Such location determination may be based on cellular signals, Wi-Fi hotspots, or other signals received by the mobile compute device 160. The peripheral devices 182 may include any type of peripheral device commonly found in a mobile computing device, for example, a hardware keyboard, input/output devices, peripheral communication devices, and/or other peripheral devices.

As discussed above, the camera device 110 and the mobile compute device 160 may be combined into a single device in some embodiments. Additionally, in some embodiments, the camera device 110 and/or the mobile compute device 160 may be embodied, separately or in combination, as a system-on-a-chip (SoC).

Figure 2:
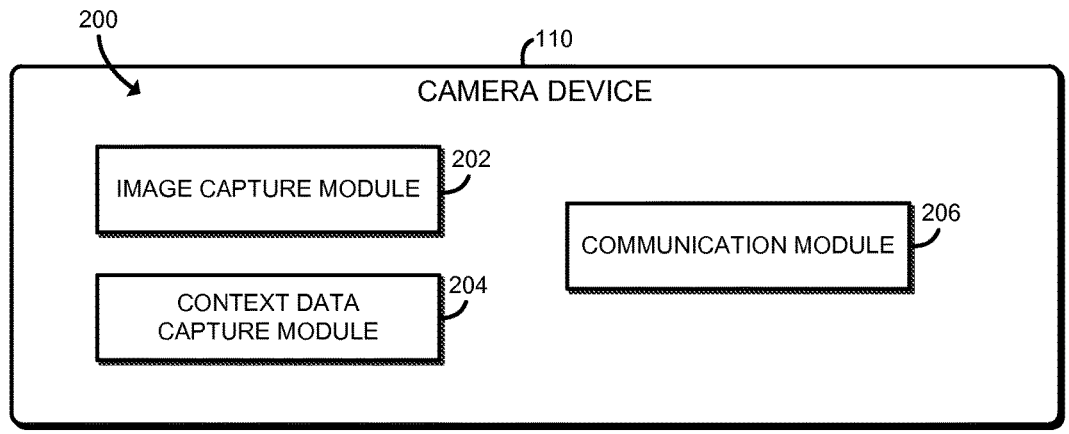
FIG. 2 is a block diagram of at least one embodiment of an environment that may be established by a camera device of the system of FIG. 1.

Referring now to FIG. 2, in use, the camera device 110 may establish an environment 200. The illustrative environment 200 includes an image capture module 202, a context data capture module 204, and a communication module 206. The various modules of the environment 200 may be embodied as hardware, software, firmware, or a combination thereof. For example, the various modules, logic, and other components of the environment 200 may form a portion of, or otherwise be established by, the processor 120 or other hardware components of the camera device 110. As such, in some embodiments, one or more of the modules of the environment 200 may be embodied as circuitry or collection of electrical devices (e.g., an image capture circuit 202, a context data capture circuit 204, a communication circuit 206, etc.). It should be appreciated that, in such embodiments, one or more of the image capture circuit 202, the context data capture circuit 204, and/or the communication circuit 206 may form a portion of one or more of the processor 120, the memory 122, the I/O subsystem 124, the data storage 130, the sensors 134, and/or the communication circuitry 126. Additionally, in some embodiments, one or more of the illustrative modules may form a portion of another module and/or one or more of the illustrative modules may be independent of one another.

The image capture module 202 is configured to capture or otherwise generate one or more images. To do so, the image capture module 202 uses the image sensor 136. In some embodiments, as discussed above, the image sensor 136 may be embodied as a CCD, CMOS, or other type of image sensor, and may be sensitive to visible light, infrared light, thermal light, ultraviolet light, or x-rays. In some embodiments, the image capture module 202 may be configured to capture images continuously or continually (e.g., as in captured video). In other embodiments, the image capture module 202 may be configured to capture images responsively, occasionally, and/or periodically, e.g., once a second, or may be configured to capture images only when instructed to by the camera device 110 and/or the mobile compute device 160.

The context data capture module 204 is configured to capture or generate context data indicative a context or characteristic of the camera device 110. For example, in the illustrative embodiments, the context data includes motion data indicative of whether the camera device 110 is in motion. The context data may be derived from any source of context data, such as sensors 134 associated with the camera device 110. In some embodiments, the context data may be embodied as the data captured from the sensors 134 without any processing. For example, the signal from the motion sensor 138 may be noisy, and indicate a small amount of motion even though the motion sensor 138 is stationary. In other embodiments, the context data may be embodied as data captured from the sensors 134 after some processing. For example, the data from the motion sensor 138 may be processed in a way as to determine whether the camera is moving or not by determining if the amount of motion reported by the motion sensor 138 is above a certain threshold. In this example, the context data could be embodied as a single bit of information, indicating that the camera is either stationary or moving.

Of course, the context data may include data indicative of other characteristics or the environment of the camera device 110. For example, in some embodiments, the context data may include data from the location sensor 140 indicative of the location of the camera device 110, such as longitude and latitude, whether the camera device 110 is indoors or outdoors, altitude, or other location data. Additionally, in some embodiments, the context data may include data indicative of the time of day. Of course, the context data may be derived from sources other than, or in addition to, the sensors 134, such as from information contained in or accessible by the camera device 110. Examples of such information include the time of day and the weather at the time and location the context data was captured. Further, in some embodiments, the context data may include data indicative of the level or color spectrum of the ambient light. Additionally, as mentioned above, the context data may include information about the environment of the camera device 110, such as if there are crowds of people nearby, or if there is movement nearby such as a waterfall. Of course, in some embodiments, the context data may include any combination of the possibilities listed above. In the illustrative embodiment, the context data is captured every time an image is captured. However, in other embodiments, the context data may be captured continuously or contemporaneously but asynchronously with the capturing of images. In other embodiments, the context data may be captured responsively, occasionally, or periodically, such as once every second.

The communication module 206 is configured to communicate the captured images and captured context data to the mobile compute device 160. In some embodiments, the communication module 206 may communicate an image automatically after each image is captured. In other embodiments, the communication module 206 may only communicate images when requested by the mobile compute device 160 or transmit collection of images periodically. In some embodiments, the context data is communicated with each image. However, in other embodiments, the communication module 206 may communicate the context data asynchronously with the communication of the associated image(s). As discussed above, the communication module 206 may communicate with the mobile compute device 160 either directly or indirectly through, for example, Ethernet, Bluetooth®, Wi-Fi®, WiMAX, near field communication (NFC), etc.

Figure 3:
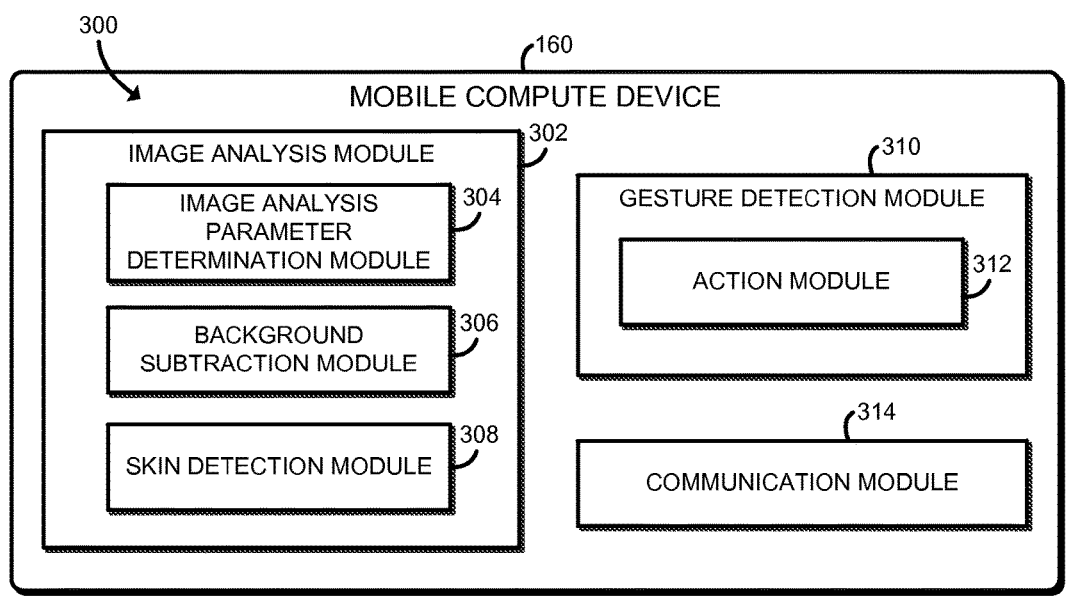
FIG. 3 is a block diagram of at least one embodiment of an environment that may be established by a mobile computing device of the system of FIG. 1.

Referring now to FIG. 3, in use, the mobile compute device 160 may establish an environment 300. The illustrative environment 300 includes an image analysis module 302, a gesture detection module 310, and a communication module 314. The illustrative image analysis module 302 includes an image analysis parameter determination module 304, a background subtraction module 306, and a skin detection algorithm such as 308. The illustrative gesture detection module includes an action module 312.

The various modules of the environment 300 may be embodied as hardware, software, firmware, or a combination thereof. For example, the various modules, logic, and other components of the environment 300 may form a portion of, or otherwise be established by, the processor 170 or other hardware components of the mobile compute device 160. As such, in some embodiments, one or more of the modules of the environment 300 may be embodied as circuitry or collection of electrical devices (e.g., an image analysis circuit 302, a gesture detection circuit 310, a communication circuit 310, etc.). It should be appreciated that, in such embodiments, one or more of the image analysis circuit 302, the gesture detection circuit 310, and/or the communication circuit 310 may form a portion of one or more of the processor 170, the memory 172, the I/O subsystem 174, the data storage 180, the sensors 184, and/or the communication circuitry 176. Additionally, in some embodiments, one or more of the illustrative modules may form a portion of another module and/or one or more of the illustrative modules may be independent of one another.

The image analysis module 302 is configured to analyze one or more images received from the camera device 110 based on the context data associated with the image(s) to detect whether a user's hand is located in the image. To do so, the image analysis module 302 may utilize one or more image analysis techniques or algorithms such as, for example, a background subtraction image analysis technique, a skin detection image analysis technique, a 3D depth detection image analysis technique, a segmentation image analysis technique, a feature or object detection image analysis technique, a landmark-based feature (e.g. Haar features) feature detection image analysis technique, an edge-based feature detection image analysis technique, a color-based image analysis technique, and/or other image analysis techniques and/or algorism. The particular image analysis technique(s) or algorithm(s) used to perform the analysis of a particular image or set of images may be dependent on the context of the camera device 110 as indicated by the context data associated with the image(s). To identify the particular image analysis technique/algorithm to be used, the image analysis parameter determination module 304 may determine one or more image analysis parameters based on the context data associated with the image(s) to be analyzed. The image analysis parameters may be embodied as any data capable of affecting the selection of, or the operation of, the image analysis technique/algorithm to be employed on the particular image(s). For example, a background subtraction technique may be used to analyze images having a relatively stationary background (e.g., the camera device 110 is not moving) to detect or identify the user's hand in the image. As such, the image analysis parameters may include data indicative of whether the camera device 110 was moving when the image(s) was captured (and/or whether the background of the captured image was in motion). Of course, other image analysis techniques/algorithms may be used if the image analysis parameters indicate that the camera device 110 was moving when the image(s) was captured. For example, one or more skin detection algorithms may be used to analyze images having a background in motion (e.g., the camera device 110 is moving) to detect or identify the user's hand in the image. Such skin detection algorithms may accept additional image analysis parameters to control the operation of the algorithms. As such, the image analysis parameters may include data indicative of which color profiles or skin profiles should be used in the image analysis procedure. For example, the optimal color profile or skin profile may depend on the lighting conditions. The lighting conditions could be determined from the context data, either directly by context data indicating level or color spectrum of the ambient light, or indirectly by context data indicating the location, time of day, whether the camera device 110 is indoors or outdoors, the weather, etc.

As discussed above, the image analysis module 302 may utilize different image analysis techniques or algorithms based on the context of the camera device 110. As such, the image analysis module 302 may include various image analysis modules to perform the various image analysis techniques or algorithms. For example, in the illustrative embodiment, the image analysis module 302 uses the background subtraction module 306 to perform background subtraction on the captured image(s), if the image analysis parameters determined by the image analysis parameter determination module 304 indicate that the camera device 110 was not moving when the one or more images were captured. Alternatively, if the image analysis parameters indicate that the camera device 110 was moving when the image(s) were captured, the image analysis module 302 may use the skin detection module 308 to perform skin detection on the captured image(s) without first performing background subtraction. As discussed above, in some embodiments, the skin detection module 308 may utilize additional image analysis parameters, such as color profiles or skin profiles, to perform the skin detection image analysis procedure. Of course, in other embodiments, the image analysis module 302 may perform other types of image analysis, such as pattern recognition, object detection, and/or object tracking, to detect whether the user's hand is located in one or more of the captured images.

If the image analysis module 302 detects that user's hand is located in the captured image via use of the image analysis technique(s)/algorithm(s), the gesture detection module 310 is configured to detect or determine a gesture performed by the user in the captured image(s). To do so, the gesture detection module 310 may utilize any suitable methodology or algorithm to detect whether the user is performing a hand gesture in the captured image. For example, in some embodiments, the gesture detection module 310 may perform an object recognition or image comparison procedure in which the gesture detection module 310 compares the user's hand to pre-stored images of the user (or other users) performing particular hand gestures. If the gesture detection module 310 detects or determines that the user is performing a recognized hand gesture, the action module 312 may perform one or more actions based on the detected gesture. Such actions may include any type of action, activity, or response on the mobile compute device 160. For example, the action may include a controlling operation of the mobile compute device 160 (e.g., controlling or responding to a software application executed by the mobile compute device 160).

The communication module 314 is configured to facilitate communications with the camera device 110 to receive the captured images and captured context data from the camera device 110. In some embodiments, the communication module 314 may receive an image automatically after each image is captured. In other embodiments, the communication module 314 may only receive images when requested by the mobile compute device 160. Additionally, as discussed above, the context data may be communicated with each image. In other embodiments, however, the context data may be received by the communication module 314 asynchronously with the receiving of the associated images.

Figure 4:
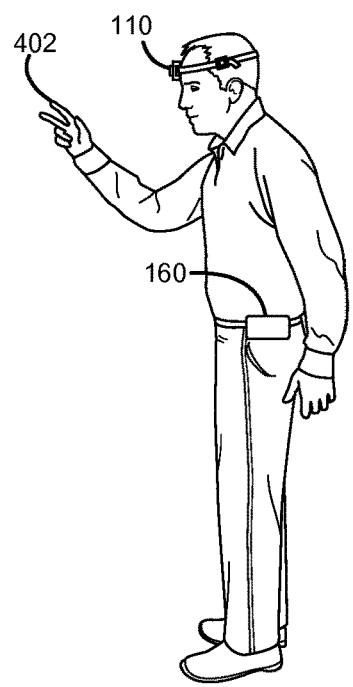
FIG. 4 is an illustration of a user of the system of FIG. 1 performing a hand gesture for a head-mounted camera while standing still.
Figure 5:
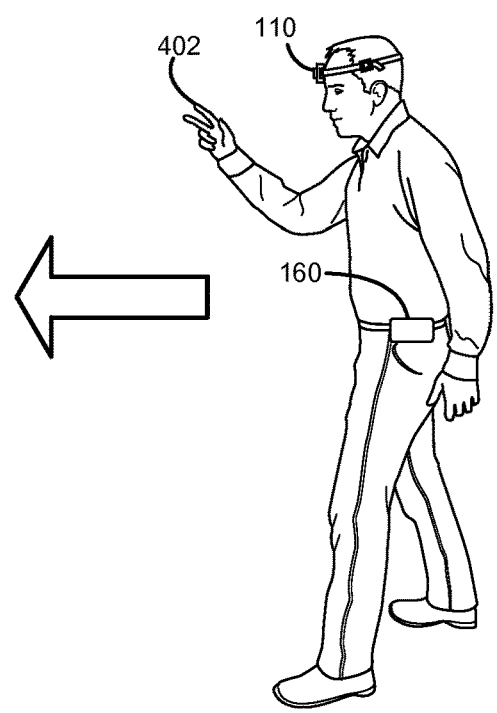
FIG. 5 is an illustration of the user of FIG. 4 performing the hand gesture for the head-mounted camera while moving.

Referring now to FIGS. 4 and 5, in the illustrative embodiment, the camera device 110 is embodied as a user-wearable camera device, such as a head-mountable camera, smart glasses, etc. For example, a user may wear the camera device 110 near his forehead and carry the mobile compute device 160 on her/his belt or person as shown illustrated in FIGS. 4 and 5. Of course, in other embodiments, the camera device 110 may be worn elsewhere on the user's body, held in the user's hand, or mounted on a rod held in the user's hand. In still other embodiments, the camera device 110 may be in a fixed position, such as set down on a surface or mounted on a tripod. Additionally, the mobile compute device 160 may be carried or worn by the user in another location (e.g., in the user's pocket). In such embodiments, the mobile compute device 160 is located near the user and within range of direct wireless communication by the camera device 110. However, in other embodiments, the mobile compute device 160 may be remote from the user, and must be communicated with over a network by the camera device 110.

In use, as shown in FIG. 4, the user may perform or make a gesture 402 in view of the camera device 110 to interact with the mobile compute device 160 (e.g., to control operation of the mobile compute device 160). In the illustrative embodiment, the gesture 402 is embodied as a hand gesture, such as a "thumbs up" or a "peace sign" gesture. However, in other embodiments, the gesture 402 may be embodied as any type of gesture capable of being performed by the user and captured in an image or image(s) by the mobile computing device 16 such as, for example, a gesture of an arm, leg, foot, both hands together, or a combination thereof. In the illustrative embodiment of FIG. 4, the user is performing the gesture 402 while standing still such that the camera device 110 is not in motion. Conversely, in the illustrative embodiment of FIG. 5, the user is performing the gesture 402 while moving forward such that the camera device 110 is in motion. As discussed above, the camera device 110 also captures context data contemporaneously with the image(s). Illustratively, the context data includes data indicative of whether the camera device 110 is in motion. As such, the mobile compute device 160 may utilize the context data to select and perform a suitable image analysis technique/algorithm on the captured image(s) based on whether the camera device 110 is in motion or not when the associated images were captured as discussed in more detail below.

Figure 6:
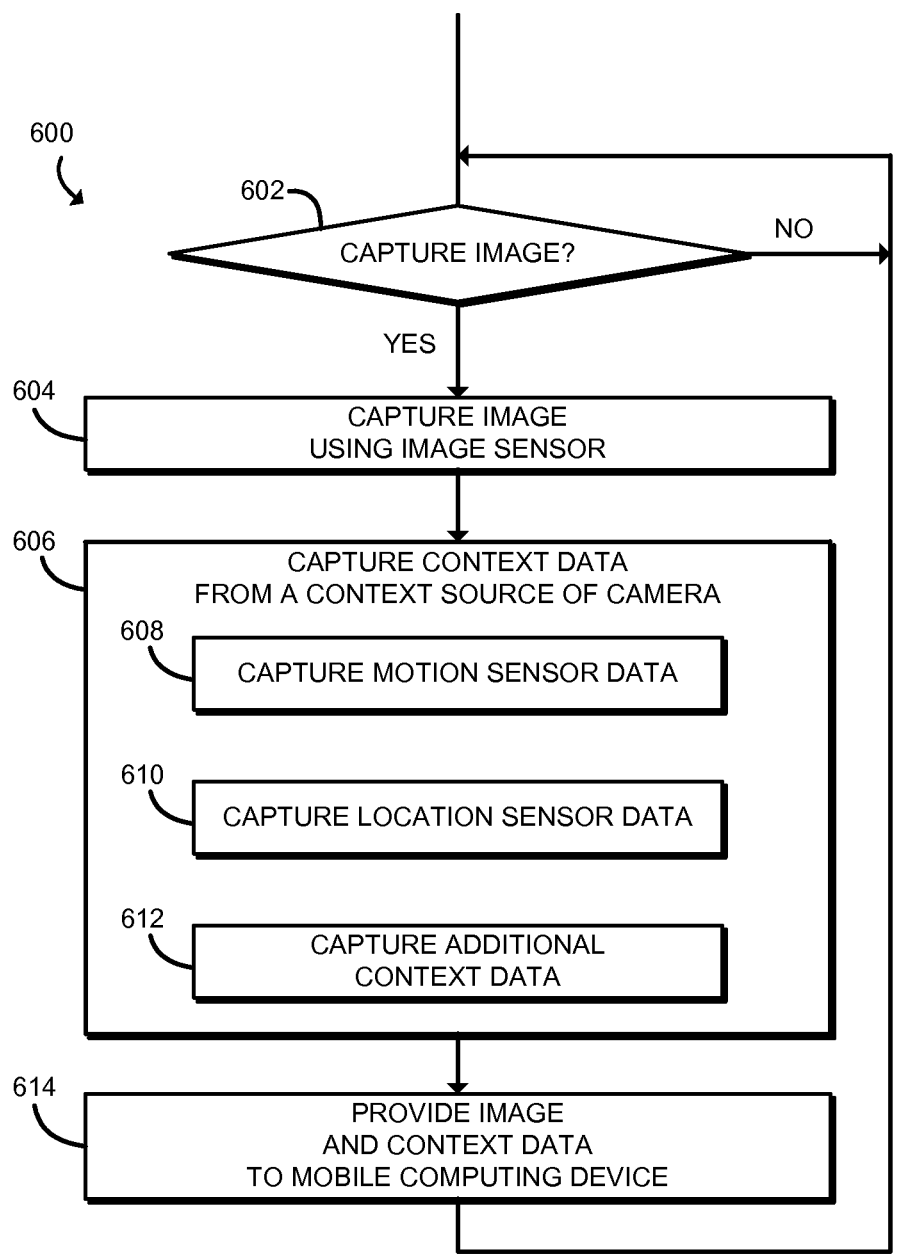
FIG. 6 is a simplified flow diagram of at least one embodiment of a method for capturing one or more images and associated context data that may be executed by the system of FIG. 1.

Referring now to FIG. 6, in use, the camera device 110 may execute a method 600 for capturing one or more images and associated context data. The method 600 begins with block 602 in which the camera device 110 determines whether to capture an image. In some embodiments, the camera device 110 may be configured to continuously, continually, occasionally, or periodically (e.g., once per second) capture images. Additionally or alternatively, the camera device 110 may be configured to capture images in response to a request or instruction received from the mobile compute device 160 or from the user (e.g., via an actuation button on the camera device 110).

If the camera device 110 is to capture an image, the method 600 proceeds to block 604 in which the camera device 110 captures an image or set of images using the image sensor 136. Additionally, in block 606, the camera device 110 captures context data from a context source of the camera device 110. As discussed above, the context data is illustratively captured contemporaneously with the image or set of images such that the context data is indicative of a context of the camera device 110 when the image(s) were captured. The context source may be embodied as any sensor, circuit, or other device of the camera device 110. For example, in block 608, the camera device 110 may capture motion sensor data indicative of a movement of the camera device 110 from the motion sensor 138. Additionally or alternatively, in block 610, the camera device 110 may capture location sensor data indicative of a location or environment of the camera device 110 from the location sensor 140. Of course, in block 612, the camera device 110 may capture other context data from other context sources, which may be indicative of any characteristic of the context of the camera device 110.

After the camera device 110 has captured the image(s) and associated context data in blocks 604 and 606, the method 600 advances to block 614 in which the camera device 110 provides the captured image(s) and associated context data to the mobile compute device 160. For example, in embodiments in which the camera device 110 is separate from the mobile compute device 160, the camera device 110 may transmit the captured image(s) and associated context data to the mobile compute device 160.

Figure 7:
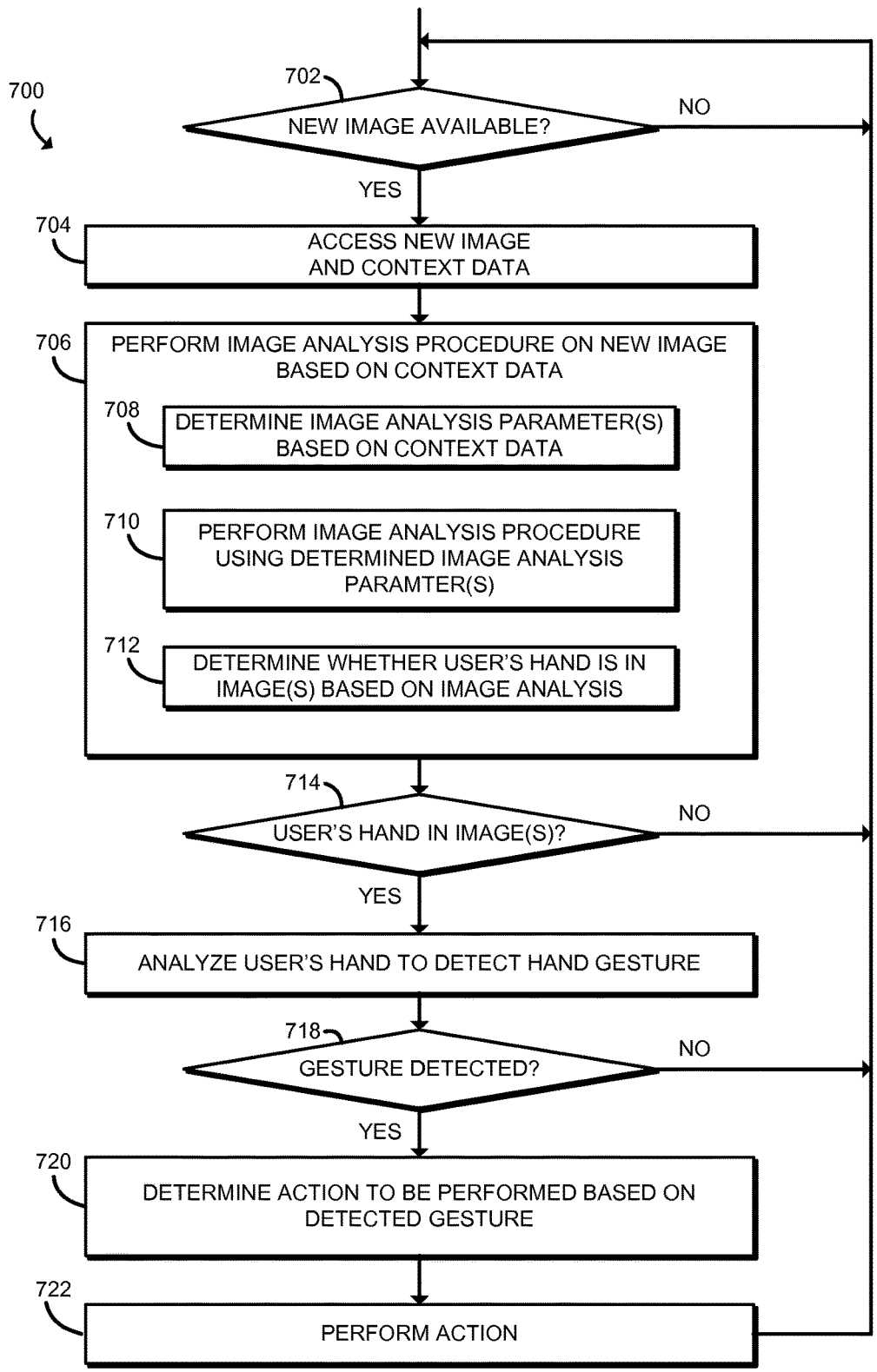
FIG. 7 is a simplified flow diagram of at least one embodiment of a method for performing hand gesture detection based on one or more images and context data associated with the one or more images that may be executed by the system of FIG. 1.

Referring now to FIG. 7, in use, the mobile compute device 160 may execute a method 700 for performing an image analysis procedure. The method 700 begins with block 702 in which the mobile compute device 160 determines whether a new image or set of images is available from the camera device 110. For example, in embodiments in which the camera device 110 is separate from the mobile compute device 160, the mobile compute device 160 may determine that a new image or set of images is available in response to receiving a transmission of the image(s) and associated context data from the camera device 110. Alternatively, in embodiments in which the camera device 110 is integral to the mobile compute device 160, the mobile compute device 160 may determine that a new image or set of images is available in response to the images being stored in the data storage 180 (or data storage 132). Of course, other mechanisms for informing the mobile compute device 160 of the availability of new images may be used in other embodiments.

If the mobile compute device 160 determines that a new image(s) is available, the method 700 advances to block 704 in which the mobile compute device 160 accesses the new image or set of images and the context data associated with the new image(s). Subsequently, in block 706, the mobile compute device 160 performs an image analysis procedure 706 on the new image(s) based on the associated context data. To do so, in block 708, the mobile compute device 160 determines one or more image analysis parameters based on the context data. As discussed above, the image analysis parameters may be embodied as any type of data capable of affecting the selection of, or the operation of, the image analysis technique/algorithm to be employed on the particular image(s). For example, the image analysis parameters may indicate whether the camera device 110 was in motion during the capturing of the associated image(s), which color profiles or skin profiles should be used in the image analysis procedure, lighting conditions of the image(s), associated weather conditions, the location at which the image(s) was captured, and so forth.

Figure 8:
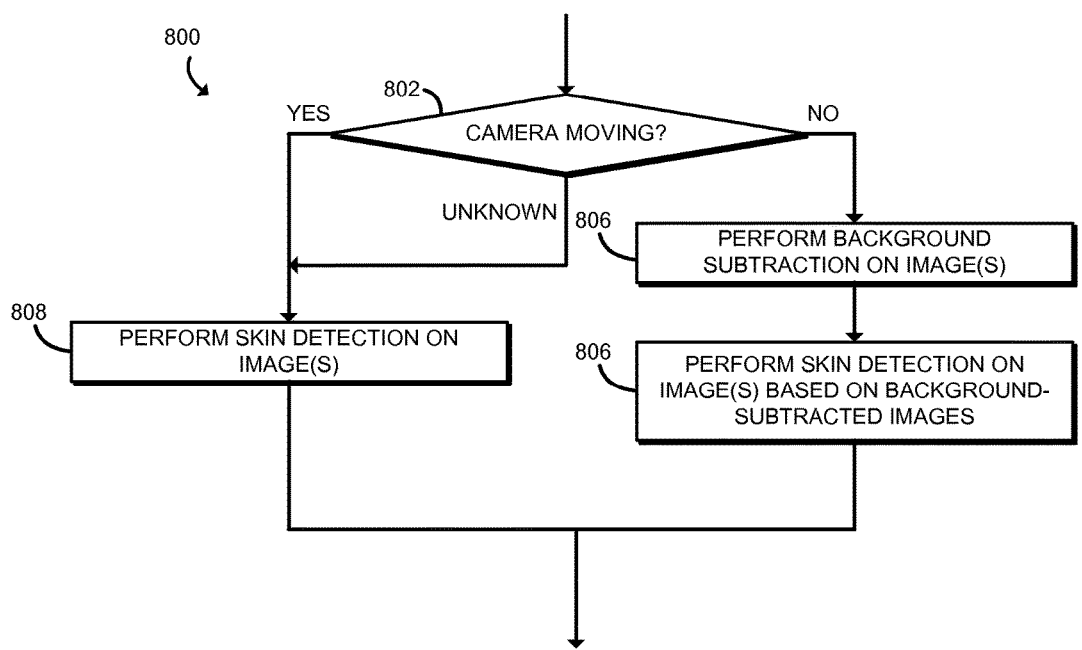
FIG. 8 is a simplified flow diagram of at least one embodiment of a method for performing an image analysis procedure based on an image analysis parameter that may be executed by the system of FIG. 1.

In block 710, the mobile compute device 160 performs an image analysis technique, algorithm, or other procedure on the image(s) based on the image analysis parameters determined in block 708. The mobile compute device 160 may utilize any suitable image analysis procedure in block 710 to analyze the captured image(s) based on the determined image analysis parameters. For example, in the illustrative embodiment, the mobile compute device 160 may execute a method 800 for performing an image analysis procedure based on the determined image analysis parameter(s) as shown in FIG. 8. The method 800 begins with block 802 in which the mobile compute device 160 determines whether the camera device 110 was in motion when the associated image(s) was captured. As discussed above, the mobile compute device 160 may make such a determination based on a corresponding image analysis parameter indicative of whether the camera device 110 is in motion. If the mobile compute device 160 determines that the camera device 110 was not in motion, the method 800 advances to block 804. In block 804, the mobile compute device 160 is illustratively configured to perform a background subtraction image analysis algorithm or technique on the captured image(s). It should be appreciated that background subtraction image analysis procedures typically work well on images which a stationary background (i.e., the camera device 110 is not moving relative to the background of the captured image). Such background subtraction image analysis procedures may allow the mobile compute device 160 to determine what is moving in the one or more images at a relatively low expense of computational resources and may also make the overall image analysis procedure less prone to errors. After the mobile compute device 160 performs the background subtraction procedure in block 804, the method 800 advances to block 806 in which the mobile compute device 160 is configured to perform a skin detection image analysis algorithm or technique on the image(s) modified in block 806 to remove the associated background. To do so, as discussed above, mobile compute device 160 may utilize one or more additional image analysis parameters determined in block 708 from the context data associated with the analyzed image(s). For example, the mobile compute device 160 may be configured to perform the skin detection image analysis procedure using one or more image analysis parameter that provides an indication of which color profiles or skin profiles should be used in the skin detection image analysis procedure.

Referring back to block 802, if the mobile compute device 160 determines that the camera device 110 was in motion or if such a determination is unknown or undeterminable, the method 800 advances to block 808. In block 808, the mobile compute device 160 is configured to perform a skin detection image analysis algorithm or technique on the captured image(s). Illustratively, the mobile compute device 160 performs the skin detection image analysis procedure in block 804 without subtraction of the background from the captured images due to the movement of the camera device 110. To do so, as discussed above, the mobile compute device 160 may utilize one or more image analysis parameters determined in block 708 from the context data associated with the analyzed image(s) (e.g., parameters indicative of which color or skin profile to use, lighting conditions of the images, etc.).

Of course, it should be appreciated that, in other embodiments, other types of image analysis techniques and/or algorithms may be used to analyze the image based on the image analysis parameters. As discussed above, the image analysis parameters may be used to determine, at least in part, which image analysis technique or set of techniques to apply. For example, in some embodiments, image analysis parameters indicative of a depth of an object or portion of an image may be used to determine whether to utilize a depth-based image analysis technique. Additionally or alternatively, the selection of the image analysis techniques may be based on an expected latency response to the user, the expected power consumption of the image analysis technique and/or the remaining power of the mobile computing device, and/or other parameters. In this way, the mobile compute device 160 is capable of adaptively selecting one or more image analysis techniques and/or algorithms to analyze the image.

Referring back to FIG. 7, after the mobile compute device 160 has performed the one or more image analysis procedures on the captured image using the determined image analysis parameter(s), the mobile compute device 160 is configured to determine whether the user's hand (or other portion of the user's body) is present in the one or more images in block 712 based on the image analysis procedure performed in block 710. As such, in block 714, the mobile compute device 160 determines whether the user's hand or other portion is detected in the analyzed image(s). If not, the method 700 loops back to block 702 in which the mobile compute device 160 continues to monitor for new captured images.

If, however, the mobile compute device 160 determines that the user's hand is present in the analyzed images in block 714, the method 700 advances to block 716. In block 716, the mobile compute device 160 analyzes the user's hand (or other portion of the user's body) located in the analyzed image(s) to detect whether the user is performing a gesture in the captured image(s). To do so, the mobile compute device 160 may utilize any suitable methodology or algorithm to detect whether the user is performing a hand gesture in the captured image. For example, in some embodiments, the mobile compute device 160 may perform an object recognition or image comparison procedure to determine whether the detected gesture is a recognized gesture.

If the mobile compute device 160 does not detect a recognizable gesture in the captured image(s) in block 718, the method 700 loops back to block 702 in which the mobile compute device 160 continues to monitor for new captured images. If, however, the mobile compute device 160 detects a recognizable gesture in the captured image(s) in block 718, the method 700 advances to block 720. In block 720, the mobile compute device 160 determines an action to be performed based on the user's gesture detected in block 718 and subsequently performs the determined action in block 722. As discussed above, such actions may include any type of action, activity, or response on the mobile compute device 160.

EXAMPLES

Illustrative examples of the devices, systems, and methods disclosed herein are provided below. An embodiment of the devices, systems, and methods may include any one or more, and any combination of, the examples described below.

Example 1 includes a mobile compute device for image analysis, the mobile compute device comprising an image analysis module to obtain (i) one or more images captured by an image sensor of a camera device and (ii) context data associated with the one or more images, wherein the context data is indicative of a context of the camera device when the one or more images were captured by the camera device and based on data from a context source of the camera device different from the image sensor, wherein the image analysis is further to determine, based on the context data, at least one image analysis parameter of an image analysis procedure to be performed on the one or more images by the mobile compute device.

Example 2 includes the subject matter of Example 1, and further including a gesture detection module to analyze the one or more images based on the at least one image analysis parameter to detect a gesture performed by a user in the one or more images.

Example 3 includes the subject matter of any of Examples 1 and 2, and further including an action module to perform action based on the detected gesture.

Example 4 includes the subject matter of any of Examples 1-3, and wherein to analyze the one or more images comprises to determine at least one image analysis procedure to be performed on the one or more images based on the at least one image analysis parameter; and perform the at least one image analysis procedure on the one or more images.

Example 5 includes the subject matter of any of Examples 1-4, and wherein to perform the at least one image analysis procedure comprises to perform the at least one image analysis procedure on the one or more images using the image analysis parameter.

Example 6 includes the subject matter of any of Examples 1-5, and wherein the at least one image analysis parameter comprises an image analysis parameter indicative of whether the camera device was in motion when the one or more images were captured by the camera device, and wherein to determine at least one image analysis procedure comprises to determine at least one image analysis procedure to be performed on the one or images dependent on a determination, based on the image analysis parameter, whether the camera device was in motion when the one or more images were captured by the camera device.

Example 7 includes the subject matter of any of Examples 1-6, and wherein to determine at least one image analysis procedure comprises to determine a skin detection image analysis procedure in response to a determination, based on the image analysis parameter, that the camera device was in motion when the one or more images were captured by the camera device, and wherein to perform the at least one image analysis procedure comprises to perform the skin detection image analysis procedure on the one or more images.

Example 8 includes the subject matter of any of Examples 1-7, and wherein to perform the skin detection image analysis procedure comprises to perform the skin detection image analysis procedure using at least one other image analysis parameter as an input to the skin detection image analysis procedure.

Example 9 includes the subject matter of any of Examples 1-8, and wherein to determine at least one image analysis procedure comprises to determine a background subtraction image analysis procedure in response to a determination, based on the image analysis parameter, that the camera device was not in motion when the one or more images were captured by the camera device, and wherein to perform the at least one image analysis procedure comprises top perform the background subtraction image analysis procedure on the one or more images.

Example 10 includes the subject matter of any of Examples 1-9, and wherein to perform the at least one image analysis procedure further comprises to perform a skin detection image analysis procedure on the one or more images subsequent to the performance of the background subtraction image analysis procedure.

Example 11 includes the subject matter of any of Examples 1-10, and wherein to obtain the one or more images and the context data comprises to receive, from the camera device, the one or more images and the context data.

Example 12 includes the subject matter of any of Examples 1-11, and wherein the context data comprises motion data indicative of whether the camera device was in motion when the one or more images were captured by the camera device.

Example 13 includes the subject matter of any of Examples 1-12, and wherein the context data comprises data indicative of an environmental condition of an environment in which the one or more images were captured.

Example 14 includes the subject matter of any of Examples 1-13, and wherein the context data comprises data indicative of a location at which the one or more images were captured.

Example 15 includes the subject matter of any of Examples 1-14, and wherein the context data comprises data indicative of a color profile or a skin profile to be used by the image analysis procedure.

Example 16 includes the subject matter of any of Examples 1-15, and wherein the camera device is integral with the mobile compute device.

Example 17 includes a camera device for capturing an image, the camera device comprising one or more context sources to generate context data indicative of a context of the camera device; image capture module to capture one or more images; and context data capture module to capture, contemporaneously with the capture of the one or more images, motion data from a motion sensor of one or more context sources indicative of whether the camera device was in motion when the one or more images were captured.

Example 18 includes the subject matter of Example 17, and further wherein the context capture module is further to capture, from a context source different from the motion sensor, context data indicative of a context of the camera device when the one or more images were captured.

Example 19 includes the subject matter of any of Examples 17 and 18, and wherein the context data comprises data indicative of a location of the camera device when the one or more images were captured.

Example 20 includes the subject matter of any of Examples 17-19, and further including image analysis module to determine, based on the context data, at least one image analysis parameter of an image analysis procedure to be performed on the one or more images.

Example 21 includes a method for facilitating image analysis by a mobile compute device, the method comprising obtaining, by the mobile compute device, (i) one or more images captured by an image sensor of a camera device and (ii) context data associated with the one or more images, wherein the context data is indicative of a context of the camera device when the one or more images were captured by the camera device and based on data from a context source of the camera device different from the image sensor; and determining, by the mobile compute device and based on the context data, at least one image analysis parameter of an image analysis procedure to be performed on the one or more images by the mobile compute device.

Example 22 includes the subject matter of Example 21, and further including analyzing, by the mobile compute device, the one or more images based on the at least one image analysis parameter to detect a gesture performed by a user in the one or more images.

Example 23 includes the subject matter of any of Examples 21 and 22, and further including performing, by the mobile compute device an action based on the detected gesture.

Example 24 includes the subject matter of any of Examples 21-23, and wherein analyzing the one or more images comprises determining, by the mobile compute device, at least one image analysis procedure to be performed on the one or more images based on the at least one image analysis parameter; and performing, by the mobile compute device, the at least one image analysis procedure on the one or more images.

Example 25 includes the subject matter of any of Examples 21-24, and wherein performing the at least one image analysis procedure comprises performing, by the mobile compute device, the at least one image analysis procedure on the one or more images using the image analysis parameter.

Example 26 includes the subject matter of any of Examples 21-25, and wherein the at least one image analysis parameter comprises an image analysis parameter indicative of whether the camera device was in motion when the one or more images were captured by the camera device, and wherein determining at least one image analysis procedure comprises determining at least one image analysis procedure to be performed on the one or images dependent on a determination, based on the image analysis parameter, whether the camera device was in motion when the one or more images were captured by the camera device.

Example 27 includes the subject matter of any of Examples 21-26, and wherein determining at least one image analysis procedure comprises determining a skin detection image analysis procedure in response to a determination, based on the image analysis parameter, that the camera device was in motion when the one or more images were captured by the camera device, and wherein performing the at least one image analysis procedure comprises performing the skin detection image analysis procedure on the one or more images.

Example 28 includes the subject matter of any of Examples 21-27, and wherein performing the skin detection image analysis procedure comprises performing the skin detection image analysis procedure using at least one other image analysis parameter as an input to the skin detection image analysis procedure.

Example 29 includes the subject matter of any of Examples 21-28, and wherein determining at least one image analysis procedure comprises determining a background subtraction image analysis procedure in response to a determination, based on the image analysis parameter, that the camera device was not in motion when the one or more images were captured by the camera device, and wherein performing the at least one image analysis procedure comprises performing the background subtraction image analysis procedure on the one or more images.

Example 30 includes the subject matter of any of Examples 21-29, and wherein performing the at least one image analysis procedure further comprises performing a skin detection image analysis procedure on the one or more images subsequent to performing the background subtraction image analysis procedure.

Example 31 includes the subject matter of any of Examples 21-30, and wherein obtaining the one or more images and the context data comprises receiving, by the mobile compute device and from the camera device, the one or more images and the context data.

Example 32 includes the subject matter of any of Examples 21-31, and wherein the context data comprises motion data indicative of whether the camera device was in motion when the one or more images were captured by the camera device.

Example 33 includes the subject matter of any of Examples 21-32, and wherein the context data comprises data indicative of an environmental condition of an environment in which the one or more images were captured.

Example 34 includes the subject matter of any of Examples 21-33, and wherein the context data comprises data indicative of a location at which the one or more images were captured.

Example 35 includes the subject matter of any of Examples 21-34, and wherein the context data comprises data indicative of a color profile or a skin profile to be used by the image analysis procedure.

Example 36 includes a method for capturing an image on a camera device, the method comprising capturing, by an image sensor of the camera device, one or more images; and capturing, from a motion sensor of the camera device and contemporaneously with the capturing of the one or more images, motion data indicative of whether the camera device was in motion when the one or more images were captured.

Example 37 includes the subject matter of Example 36, and further including capturing, from a context source of the camera device different from the motion sensor, context data indicative of a context of the camera device when the one or more images were captured.

Example 38 includes the subject matter of any of Examples 36 and 37, and wherein the context data comprises data indicative of a location of the camera device when the one or more images were captured.

Example 39 includes the subject matter of any of Examples 36-38, and further including determining, by the camera device and based on the context data, at least one image analysis parameter of an image analysis procedure to be performed on the one or more images.

Example 40 includes one or more machine-readable storage media comprising a plurality of instructions stored thereon that in response to being executed result in a compute device performing the method of any of Examples 21-39.

Example 41 includes a compute device comprising a processor; and a memory having stored therein a plurality of instructions that when executed by the processor cause the compute device to perform the method of any of Examples 21-39.

Example 42 includes a mobile compute device for image analysis, the mobile computing device comprising means for obtaining (i) one or more images captured by an image sensor of a camera device and (ii) context data associated with the one or more images, wherein the context data is indicative of a context of the camera device when the one or more images were captured by the camera device and based on data from a context source of the camera device different from the image sensor; and means for determining, based on the context data, at least one image analysis parameter of an image analysis procedure to be performed on the one or more images by the mobile compute device.

Example 43 includes the subject matter of Example 42, and further including means for analyzing the one or more images based on the at least one image analysis parameter to detect a gesture performed by a user in the one or more images.

Example 44 includes the subject matter of any of Examples 42 and 43, and further including means for performing an action based on the detected gesture.

Example 45 includes the subject matter of any of Examples 42-44, and wherein the means for analyzing the one or more images comprises means for determining at least one image analysis procedure to be performed on the one or more images based on the at least one image analysis parameter; and means for performing the at least one image analysis procedure on the one or more images.

Example 46 includes the subject matter of any of Examples 42-45, and wherein the means for performing the at least one image analysis procedure comprises means for performing the at least one image analysis procedure on the one or more images using the image analysis parameter.

Example 47 includes the subject matter of any of Examples 42-46, and wherein the at least one image analysis parameter comprises an image analysis parameter indicative of whether the camera device was in motion when the one or more images were captured by the camera device, and wherein the means for determining at least one image analysis procedure comprises means for determining at least one image analysis procedure to be performed on the one or images dependent on a determination, based on the image analysis parameter, whether the camera device was in motion when the one or more images were captured by the camera device.

Example 48 includes the subject matter of any of Examples 42-47, and wherein the means for determining at least one image analysis procedure comprises means for determining a skin detection image analysis procedure in response to a determination, based on the image analysis parameter, that the camera device was in motion when the one or more images were captured by the camera device, and wherein the means for performing the at least one image analysis procedure comprises means for performing the skin detection image analysis procedure on the one or more images.

Example 49 includes the subject matter of any of Examples 42-48, and wherein the means for performing the skin detection image analysis procedure comprises means for performing the skin detection image analysis procedure using at least one other image analysis parameter as an input to the skin detection image analysis procedure.

Example 50 includes the subject matter of any of Examples 42-49, and wherein the means for determining at least one image analysis procedure comprises means for determining a background subtraction image analysis procedure in response to a determination, based on the image analysis parameter, that the camera device was not in motion when the one or more images were captured by the camera device, and wherein the means for performing the at least one image analysis procedure comprises means for performing the background subtraction image analysis procedure on the one or more images.

Example 51 includes the subject matter of any of Examples 42-50, and wherein the means for performing the at least one image analysis procedure further comprises means for performing a skin detection image analysis procedure on the one or more images subsequent to performing the background subtraction image analysis procedure.

Example 52 includes the subject matter of any of Examples 42-51, and wherein the means for obtaining the one or more images and the context data comprises means for receiving, from the camera device, the one or more images and the context data.

Example 53 includes the subject matter of any of Examples 42-52, and wherein the context data comprises motion data indicative of whether the camera device was in motion when the one or more images were captured by the camera device.

Example 54 includes the subject matter of any of Examples 42-53, and wherein the context data comprises data indicative of an environmental condition of an environment in which the one or more images were captured.

Example 55 includes the subject matter of any of Examples 42-54, and wherein the context data comprises data indicative of a location at which the one or more images were captured.

Example 56 includes the subject matter of any of Examples 42-55, and, wherein the context data comprises data indicative of a color profile or a skin profile to be used by the image analysis procedure.

Example 57 includes a camera device for capturing an image, the camera device comprising means for capturing one or more images; and means for capturing, contemporaneously with the capturing of the one or more images, motion data indicative of whether the camera device was in motion when the one or more images were captured.

Example 58 includes the subject matter of Example 57, and further including means for capturing context data indicative of a context of the camera device when the one or more images were captured.

Example 59 includes the subject matter of any of Examples 57 and 58, and wherein the context data comprises data indicative of a location of the camera device when the one or more images were captured.

Example 60 includes the subject matter of any of Examples 57-59, and further including means for determining, based on the context data, at least one image analysis parameter of an image analysis procedure to be performed on the one or more images.

The invention claimed is:

1. A mobile compute device comprising:
   a processor; and
   an image analysis module to:
   obtain (i) one or more images captured by an image sensor of a camera device and (ii) context data associated with the one or more images, wherein the context data is indicative of whether the camera device was in motion and whether one or more objects in a background of the one or more images were in motion relative to the background when the one or more images were captured by the camera device, and
   select, based on whether the camera device was in motion and whether the one or more objects in the background of the one or more images were in motion relative to the background when the one or more images were captured by the camera device, a selected image analysis procedure from a plurality of image analysis procedures, wherein to select comprises to: (i) select a skin detection image analysis procedure with background subtraction in response to a determination that the one or more objects in the background of the one or more images were not in motion relative to the background when the one or more images were captured by the camera device and (ii) select a skin detection image analysis procedure without background subtraction in response to a determination that the one or more objects in the background of the one or more images were in motion relative to the background when the one or more images were captured by the camera device; and
   a gesture detection module to perform the selected image analysis procedure on the one or more images to detect a gesture performed by a user in the one or more images.

2. The mobile compute device of claim 1, wherein the context data comprises at least one of (i) data indicative of an environmental condition of an environment in which the one or more images were captured, (ii) data indicative of a location at which the one or more images were captured, or (iii) data indicative of a color profile or a skin profile to be used by the image analysis procedure.

3. The mobile compute device of claim 2, wherein the environmental condition of the environment in which the one or more images were captured comprises an indication of movement nearby the camera device, and wherein to select the image analysis procedure from the plurality of image analysis procedures comprises to select, based on the environmental condition comprising the indication of movement nearby the camera device, the image analysis procedure from the plurality of image analysis procedures.

4. The mobile compute device of claim 3, wherein the indication of movement nearby the camera device comprises and indication of a crowd of people nearby the camera device, and wherein to select the image analysis procedure from the plurality of image analysis procedures comprises to select, based on the indication of the crowd of people nearby the camera device, the image analysis procedure from the plurality of image analysis procedures.

5. The mobile compute device of claim 3, wherein the indication of movement nearby the camera device comprises an indication of a location associated with a moving environment, wherein the association of the location with the moving environment is predetermined before obtention of the one or more images.

6. A method comprising:
obtaining, by a mobile compute device, (i) one or more images captured by an image sensor of a camera device and (ii) context data associated with the one or more images, wherein the context data is indicative of whether the camera device was in motion and whether one or more objects in a background of the one or more images were in motion relative to the background when the one or more images were captured by the camera device;
selecting, by the mobile compute device and based on whether the camera device was in motion and whether the one or more objects in the background of the one or more images were in motion relative to the background when the one or more images were captured by the camera device, a selected image analysis procedure from a plurality of image analysis procedures, wherein selecting the selected image analysis procedure comprises: (i) selecting a skin detection image analysis procedure with background subtraction in response to a determination that the one or more objects in the background of the one or more images were not in motion relative to the background when the one or more images were captured by the camera device and (ii) selecting a skin detection image analysis procedure without background subtraction in response to a determination that the one or more objects in the background of the one or more images were in motion relative to the background when the one or more images were captured by the camera device; and
performing, by the mobile compute device, the image analysis procedure on the one or more images to detect a gesture performed by a user in the one or more images.

7. One or more non-transitory machine-readable storage media comprising a plurality of instructions stored thereon that, when executed, cause a compute device to:
obtain (i) one or more images captured by an image sensor of a camera device and (ii) context data associated with the one or more images, wherein the context data is indicative of whether the camera device was in motion and whether one or more objects in a background of the one or more images were in motion relative to the background when the one or more images were captured by the camera device;
select, based on whether the camera device was in motion and whether the one or more objects in the background of the one or more images were in motion relative to the background when the one or more images were captured by the camera device, a selected image analysis procedure from a plurality of image analysis procedures, wherein to select comprises to: (i) select a skin detection image analysis procedure with background subtraction in response to a determination that the one or more objects in the background of the one or more images were not in motion relative to the background when the one or more images were captured by the camera device and (ii) select a skin detection image analysis procedure without background subtraction in response to a determination that the one or more objects in the background of the one or more images were in motion relative to the background when the one or more images were captured by the camera device; and
perform the image analysis procedure on the one or more images to detect a gesture performed by a user in the one or more images.

8. The one or more non-transitory machine-readable storage media of claim 7, wherein the plurality of image analysis procedures consists of a first image analysis procedure and a second image analysis procedure,
wherein the first image analysis procedure comprises a skin detection image analysis without background subtraction and wherein the second image analysis procedure comprises a skin detection image analysis with background subtraction.

9. The one or more non-transitory machine-readable storage media of claim 8, wherein to select the image analysis procedure from the plurality of image analysis procedures comprises to select the first image analysis procedure in response to a determination that the one or more objects in the background of the one or more images were in motion when the one or more images were captured by the camera device.

10. The one or more non-transitory machine-readable storage media of claim 8, wherein to select the image analysis procedure from the plurality of image analysis procedures comprises to select the second image analysis procedure in response to a determination that the camera device was not in motion when the one or more images were captured by the camera device and a determination that the one or more objects in the background of the one or more images were not in motion when the one or more images were captured by the camera device.

11. The one or more non-transitory machine-readable storage media of claim 7, wherein the context data comprises at least one of (i) data indicative of an environmental condition of an environment in which the one or more images were captured, (ii) data indicative of a location at which the one or more images were captured, or (iii) data indicative of a color profile or a skin profile to be used by the image analysis procedure.

12. The one or more non-transitory machine-readable storage media of claim 11, wherein the environmental condition of the environment in which the one or more images were captured comprises an indication of movement nearby the camera device, and wherein to select the image analysis procedure from the plurality of image analysis procedures comprises to select, based on the environmental condition comprising the indication of movement nearby the camera device, the image analysis procedure from the plurality of image analysis procedures.

13. The one or more non-transitory machine-readable storage media of claim 12, wherein the indication of movement nearby the camera device comprises and indication of a crowd of people nearby the camera device, and wherein to select the image analysis procedure from the plurality of image analysis procedures comprises to select, based on the indication of the crowd of people nearby the camera device, the image analysis procedure from the plurality of image analysis procedures.

14. The one or more non-transitory machine-readable storage media of claim 12, wherein the indication of movement nearby the camera device comprises an indication of a location associated with a moving environment, wherein the association of the location with the moving environment is predetermined before obtention of the one or more images.

\* \* \* \* \*